United States Patent Office 3,090,750
Patented May 21, 1963

3,090,750
METHOD OF PRODUCING HEAT-STABLE GREASES
Charles R. Bergen, Schenectady, N.Y., and Warren W. Woods, Ponca City, Okla., assignors to Continental Oil Company, Ponca City, Okla., a corporation of Delaware
No Drawing. Filed May 19, 1960, Ser. No. 30,068
21 Claims. (Cl. 252—18)

This invention relates to improved grease compositions. More particularly, this invention relates to methods of preparing improved soapless grease compositions which possess improved stability with respect to the effects of heat.

This invention is a continuation-in-part of our copending applications Serial Number 538,807, filed October 5, 1955, and now abandoned, and Serial Number 661,031, filed May 23, 1957, and now abandoned, which in turn is a continuation-in-part of Serial Number 432,610, filed May 26, 1954, and now abandoned.

Greases prepared by the use of the normal soap-forming ingredients, such as the acids derived from animal fats or vegetable oils, exhibit phase changes with increasing temperature up to a point at which the soap dissolves or at least forms a colloidal dispersion in the lubricating oil base with consequent loss of mechanical structure responsible for grease-like properties. Furthermore, these greases generally do not reform spontaneously upon cooling. As a result, such greases are unsuitable for use in the lubrication of bearings operated at elevated temperatures, such as those used in certain aircraft mechanisms and the like.

Several methods of preparing heat stable greases have been proposed in the prior art. One proposal incorporates certain salts of aromatic acids in the grease composition such as sodium benzoate, which apparently forms complexes with the normal soap-forming acids. While these additives impart heat stability to the resulting grease, it is necessary to heat such grease compositions during the process of manufacture to a temperature of at least 500 to 600° F. This is a disadvantage because temperatures in this range involve fire hazards and promote oxidative degradation of the oil carrier. Another method heretofore proposed for the preparation of heat stable greases involves the formation of an inorganic hydrogel and subsequently replacing the interstitial water contained in the gel with an oleaginous liquid vehicle. Two procedures have been suggested for the replacement of the interstitial water. In one an aerogel is first formed by displacing the water with a solvent which is soluble in both water and oil. In the second procedure the hydrogel is heated in the presence of a surface-active agent dissolved in an oleaginous liquid vehicle; U.S. Patent 2,625,508 to Fred H. Stross describes this procedure. Whichever procedure is used, several disadvantages are inherent in the process, as, for example, a hydrogel is bulky and difficult to handle, the gel must be washed to remove salts, and hydrogels contain a large amount of water which must be removed.

It is, therefore, an object of the present invention to produce improved greases which obviate the disadvantages of the prior art. It is another object of the invention to produce a grease which will spontaneously recover its structure on cooling after being melted. It is a special object of our invention to provide a process for producing a grease having the afore-mentioned properties. Other objects will become apparent as the invention is hereinafter more thoroughly described.

In accordance with the present invention, greases of the above-described characteristics are obtained by a process which comprises:

(1) Forming an admixture comprising an oil-insoluble inorganic base, a dispersing agent, an oleaginous vehicle, an acidic coupling agent, and solvent, (2) Removing the volatile materials (solvent and water, if present) and thereby forming a grease composition.

In a first (and preferred) embodiment of our invention, the greases of our invention are prepared by a process which comprises:

(1) Forming a colloidal dispersion of an oil-insoluble inorganic base in an oleaginous liquid, (2) Adding to the colloidal dispersion-oleaginous liquid mixture an acidic coupling agent and a solvent, or solvents, (3) Removing the volatile materials (solvent and water, if present) and thereby forming a grease composition.

In a second embodiment, the greases of our invention are formed by a process which comprises:

(1) Forming an admixture comprising an oil-insoluble inorganic base, a dispersing agent, an oleaginous vehicle, an acidic coupling agent, and a solvent or solvents, (2) Removing the volatile materials and thereby forming a grease composition.

The formation of the dispersion in the presence of the coupling agent, as in the second embodiment, results in the formation of smaller particles of dispersoid material.

In a third embodiment, the greases of our invention are formed by a process which comprises:

(1) Forming a dispersion, containing an oil-insoluble inorganic base, in the presence of a minor amount of an acidic coupling agent, (2) Adding thereto a solvent, or solvents, and an additional amount of an acidic coupling agent, (3) Removing the volatile materials and thereby forming a grease composition.

In connection with the third embodiment, the minor amount of coupling agent in step (1) is less than a grease-forming amount, while the additional amount of coupling agent in step (2) is sufficient to form a grease.

Before presenting examples which illustrate our invention, it may be well to indicate in general the nature of the materials used and the process conditions.

The oleaginous liquid vehicle employed in these compositions can be a mineral lubricating oil obtained by any of the conventional refining procedures. Other oleaginous materials which can be used are vegetable oils, such as corn oil, cottonseed oil, castor oil, etc., and animal oils such as lard oil, sperm oil, etc. For some purposes, various synthetic oils can be employed with particular advantage, such as, for example, polyalkylene glycols, various high molecular weight esters, and silicone polymer oil. Preferred oleaginous liquid vehicles include mineral lubricating oil and synthetic oil (or synthetic lubricant).

The oil-insoluble inorganic bases for use in our invention are preferably metal carbonates, hydroxides, or mixtures of carbonates and hydroxides. In general, these oil-insoluble inorganic bases are precipitated in colloidal form (through the use of the dispersing agent) in the oleaginous liquid vehicle. These colloidal dispersions of the inorganic material (i.e., inorganic base) in the oleaginous liquid vehicle may be prepared by various methods. Whatever method is used for preparing the dispersion of the inorganic material in the oil, the diameter of the individual particles of the inorganic solid must be less than 5 microns, preferably less than 0.5 micron. One such method is that disclosed by the present co-inventor, Woods, in his Canadian patent application Serial No. 650,431, filed July 7, 1953. Another method is that disclosed by Carlyle in the copending application Serial No. 629,229, filed December 19, 1956, and now U.S. Patent No. 2,937,991. Yet another method is that disclosed by Peter A. Asseff et al. in U.S. Patent 2,616,904, which disclosure is made a part of this application.

Another method is that disclosed in application Serial No. 15,031, filed March 31, 1960, and having the same assignee as the present application. Still another method is that disclosed in application Serial No. 15,032, filed March 31, 1960, and having the same assignee as the present application.

Additional methods of preparing the dispersion include the following: Carlyle et al. in application Serial No. 653,264, filed April 15, 1957, now U.S. Patent No. 2,956,018, and having the same assignee as the present application; Carlyle et al. in U.S. Patent No. 2,889,279, issued June 2, 1959; Carlyle et al. in U.S. Patent No. 2,895,913, issued July 21, 1959; Thompson et al. in U.S. Patent No. 2,931,773, issued April 5, 1960; Oscar L. Wright in U.S. Patent 2,924,617, issued February 9, 1960.

Briefly, the Woods application discloses a method of forming a stable oil dispersion of a basic water-soluble inorganic compound by first dissolving the inorganic solid compound in water at concentrations ranging up to saturation; emulsifying this aqueous solution in an oleaginous liquid vehicle containing as a dispersing agent an organic acid of which the normal alkali and alkaline earth metal salts are oil soluble or an organic compound which upon hydrolysis yields such an acid; forming a finely divided water-in-oil emulsion; and then dehydrating the emulsion.

The Carlyle application teaches a method of dispersing solid basic inorganic salts in an oil phase by means of volatile organic solvents, the process of which may be described as comprising the steps of admixing at least one basically reacting organic metal compound, an organic acid compound of the type of which the barium salts of the anion are oil soluble, mutual solvents for these compounds, and water to form a homogeneous mass, condensing in the homogeneous mass the basic oil insoluble inorganic salt, and subsequently removing the residual solvents and water therefrom. As above used, the descriptive terms for the organic acid and organic acid compounds, are meant for the purposes of this invention to include the oil-soluble free acids and salts thereof as well as organic compounds which, upon neutral or alkaline hydrolysis, yield oil-soluble acids or salts.

In brief, Asseff et al. teach a process whereby an alkaline earth metal organic complex may be prepared from an oil-soluble organic acid which complex contains in basic form an amount of metal substantially in excess of the stoichiometric amount required to form the normal metal salt. The complex for the purpose of this invention is substantially equivalent to dispersions as prepared by either the Woods or Carlyle methods.

Application Serial No. 15,031 teaches a process for preparing a dispersion of a magnesium compound. Briefly, the process comprises:

(1) Adding a glycol ether solution of an oil-soluble magnesium alkoxide-carbonate complex to an admixture comprising an oil-soluble dispersing agent, a nonvolatile carrier, and water in an amount which is a stoichiometric excess of that required to react with said magnesium alkoxide-carbonate complex, (2) Hydrolyzing the magnesium alkoxide-carbonate complex to an oil-insoluble magnesium-containing inorganic compound, and then (3) Removing the volatile material.

The term "nonvolatile carrier," as used in applications Serial Nos. 15,031 and 15,032, is equivalent to the term "Oleaginous liquid vehicle" as used herein.

Application Serial No. 15,032 teaches a process for preparing a dispersion of a calcium compound. Briefly, the process comprises:

(1) Adding an alcoholic solution of an oil-soluble calcium alkoxide-carbonate complex to an admixture comprising an oil-soluble dispersing agent, a non-volatile carrier, and water in an amount which is stoichiometric excess of that required to react with the calcium alkoxide-carbonate complex, (2) Hydrolyzing the resulting mixture whereby said calcium-containing compound is formed, and then, (3) Removing the volatile materials.

The disclosures of the above-mentioned applications (Serial Nos. 15,031 and 15,032) are made a part of this application. The additional details concerning their processes are available therein.

Application Serial No. 653,264 teaches a process for preparing dispersions of sodium, barium, or calcium compounds in a liquid lubricating oil composition. Briefly, the process comprises the following steps: (a) adding an inorganic compound (e.g., barium oxide) to an aliphatic monohydric alcohol containing from 1 to 5 carbon atoms, (b) forming an oil-insoluble complex by passing carbon dioxide through alcohol-inorganic compound mixture in the presence of water, (c) dispersing the resulting complex in a liquid lubricating oil containing an oil-soluble dispersing agent, and (d) heating the resulting dispersion whereby said alcohol is removed and said complex is decomposed.

U.S. Patent No. 2,889,279 teaches a process for preparing dispersions of calcium hydroxide, barium oxide or lead oxide in oleaginous compositions. Briefly, the process comprises the following steps: (a) forming a mixture comprising an inorganic compound (e.g., calcium hydroxide), an amino compound which may be either an alkanol amine or ethylene diamine, a hydrocarbon, and an oil-soluble sulfonate, (b) passing carbon dioxide through said mixture, whereby a complex is formed, (c) hydrolyzing said complex by adding water, and (d) removing the water and amino compound by heating.

U.S. Patent 2,895,913 teaches a process for preparing a stable dispersion of a basic, magnesium-containing compound in a lubricating oil composition. The process comprises: (a) reacting magnesium with an excess of an alkanol containing less than 6 carbon atoms forming an alkanol insoluble magnesium alkoxide, (b) forming an alkanol soluble magnesium alkoxide-carbon dioxide complex by passing carbon dioxide through the magnesium alkoxide-alkanol mixture until the same is acid to alpha-naphthol benzein indicator, (c) adding said complex to a lubricating oil containing an oil-soluble dispersing agent in an amount that is sufficient to give a magnesium content of the resulting mixture that is greater than that produced by the presence of chemically combined magnesium in the oil-soluble dispersing agent alone whereby a homogeneous system is formed, and (d) condensing from said homogeneous system an oil-insoluble magnesium compound in particles the diameter of which are less than 0.25 micron by heating said system whereby said alkanol is removed and said complex is decomposed.

U.S. Patent No. 2,931,773 teaches a process for dispersing calcium carbonate in a lubricating oil. Briefly, the process comprises: (a) forming a mixture comprising a lubricating oil, an oil-soluble dispersing agent, and finely divided calcium cyanamide, (b) passing steam through said mixture whereby said calcium cyanamide is converted to calcium carbonate, and (c) removing the undispersed solids and water.

U.S. Patent No. 2,924,617 teaches a process for preparing oil-dispersible highly basic sulfonates. Briefly, the process comprises: (a) reacting an alkaryl sulfonic acid with an excess of ammonium hydroxide, whereby a mixture of ammonium alkaryl sulfonate and alkaryl sulfonamide is produced, (b) heating the reaction mixture to decompose the ammonium sulfonate, (c) diluting the alkaryl sulfonamide with an organic solvent and adding thereto an alkaline earth metal oxide or hydroxide dissolved in a polar solvent, and (d) removing the solvents and water by distillation to form the highly basic alkaryl sulfonate.

With regard to suitable dispersing agents for use in our process, any of the dispersing agents, listed in the aforementioned applications, used in the preparation of the colloidal dispersion of inorganic compound can be used in our process. Preferred dispersing agents include oil-soluble sulfonic acids, oil-soluble carboxylic acids, and metal salts thereof.

It should be noted that, in general, the colloidal dispersions which are suitable for use in our invention are characterized by having the inorganic compound formed in situ and simultaneously, while forming the dispersion. This results in a smaller, and more uniform, particle size for the inorganic compound. The advantages of smaller particle size will be discussed elsewhere.

Suitable coupling agents, or, as they are sometimes designated, grease forming gelling agents, are organic acidic materials and include the following:

Diglycolic acid
3-methyl glutaric acid
Pelargonic acid
Polyoxyalkylene dicarboxylic acids of the general formula $HOOC(C_2H_4O)_xCOOH$, wherein $x$ is from at least 1 to about 10
Alkyl acid phosphates wherein the alkyl group contains from 3 to 8 carbon atoms For best results we prefer 3-methyl glutaric acid, diglycolic acid, or the polyoxyalkylene dicarboxylic acid available commercially under the trade name of Pluroxin E-231 from Wyandotte Chemical Corporation of Wyandotte, Michigan. Pluroxin E-231 is a straw-colored viscous liquid having a density of 1.3, refractive index of 1.468, a freezing point of −16 to −20° C., and the general formula $HOOC(C_2H_4O)_xCOOH$, wherein $x$ has an average value of about 3.2 and the average molecular weight of the compound is 231.

The preceding coupling agents can be used in all of the three embodiments of the process of our invention. In addition, in step one of the third embodiment, other materials can be used. Materials suitable for use in this particular step include dicarboxylic acids, such as aliphatic, aromatic, and cycloaromatic dicarboxylic acids. Specific examples of aliphatic dicarboxylic acids are succinic, glutaric, adipic, pimelic, suberic, azelaic, sebacic, nonanedicarboxylic, decanedicarboxylic, maleic, fumaric, citraconic, tartaric, and citric acids. Specific aromatic and cycloaromatic acids include phthalic, isophthalic, and terephthalic acids and ortho-, meta-, and para-cyclohexane-dicarboxylic acids.

While we do not wish to be bound by any particular theory as to how the coupling agents form grease-type gels when added to the inorganic dispersion, we believe that the correct explanation of their function is substantially as follows:

The acidic coupling agent is added to the inorganic dispersion at a level by which it can react with all or a portion of the dispersed basic particles. The metal salt of the coupling agent is formed, as indicated by the evolution of $CO_2$. The insoluble portion of the resultant gel is believed to be particles of (1) the metal salt of the coupling agent (where sufficient coupling agent is added to react with 100 percent of the dispersed phase) or of (2) the unreacted inorganic compound coated with the metal salt of the coupling agent (where less than stoichiometric amounts of coupling agents are added). This is indicated by comparison of the electron micrographs of the inorganic dispersion prior to and after the reaction with the coupling agent. Specifically, when dispersed particles of calcium carbonate of approximately 1/25 micron diameter are reacted with 80 percent of the theoretical amount of 3-methyl glutaric acid necessary for neutralization, the resulting particles which form the grease structure are approximately 1/8 micron in diameter. These particles are believed to contain a core of calcium carbonate of a diameter equal to 1/2 of the original diameter which is coated with the calcium salt of 3-methyl glutaric acid.

In some instances, it is desirable to use a solvent or mixture of solvents in our process. For example, it may be desirable to add a solvent to the admixture to render it fluid for easy handling. Suitable solvents for the colloidal dispersion of inorganic compound in an oleaginous vehicle include materials such as petroleum solvents having a boiling point under 150° C. Specific examples include petroleum naphtha, hexane, pentane, benzene, and toluene.

It may be noted that the preceding solvents function as a diluent or solvent for the oleaginous vehicle but not as a solvent for the "colloidal dispersion."

In addition, it may be desirable to employ a solvent for the coupling agent in order that it can be added in solution. (However, it should be noted that the coupling agent can be added as a solid at some possible sacrifice in reaction rate.) In some instances, the hydrocarbon solvents listed above can be used for the coupling agents. In addition, the following can be used in general: water, aliphatic alcohols, such as methanol, ethanol, n-propanol, iso-propanol, normal, secondary and tertiary butanol, and ketones, such as acetone and methyl ethyl ketone.

The amount of solvents is not critical in either instance. In the first instance, a sufficient amount can be used to render the admixture fluid for easy handling. In the second instance, sufficient solvent is used to dissolve the coupling agent.

The amounts of oil-insoluble inorganic compound, dispersing agent, and oleaginous liquid vehicle which we have found can be used in our process are as follows, stated as percent by weight of the composition, before addition of the coupling agent.

|  | Suitable range | Preferred range |
| --- | --- | --- |
| Oil-insoluble inorganic base | 1-35 | 2-12 |
| Dispersing agent | 2-55 | 5-15 |
| Oleaginous liquid vehicle | 97-10 | 93-73 |

The amount of coupling agent which can be used varies with the different embodiments of the process of our invention. The amount is always stated as a percentage of the theoretical (or stoichiometric) amount required for reaction with the inorganic compound. In the first and second embodiments of our invention, a suitable range is from 30 to 100 percent of the theoretical amount. In the first step of the third embodiment, a suitable range is from 1 to 35 percent. In the second step of this embodiment, the remainder (for a total of 30 to 100 percent) is added. The amount of coupling agent required for gelation is dependent on the particular coupling agent used. In other words, some coupling agents require a larger amount than others. The preceding ranges are given to cover all of the suitable coupling agents in combination with any of the operable dispersing agents.

Generally, the mixture after the addition of the grease-forming gelling agent should be mildly heated to promote the reaction of the coupling agent with the dispersed inorganic base. Temperatures within the range of about 20 to 150° C. are satisfactory, but temperatures within the range of about 50 to 90° C. are preferred. If for any reason it becomes desirable to carry out the reaction at a lower temperature, this result can be facilitated by adding to the mixture a solvent for the grease-forming gelling agent. Suitable solvents include hydrocarbons, ketones, and alcohols. In some cases, it may be beneficial to incorporate an oxidation inhibitor in the grease and, when such a procedure is followed any of the oxidation inhibitors ordinarily used in lubricating oil may be employed.

The greases prepared in accordance with our invention require little or no mechanical working to develop structure and possess excellent thermal stability. In addition, these greases possess the remarkable ability of reforming to their initial structure upon cooling after being heated to a temperature above their dropping points. We have found that the consistency of these greases is practically independent of the type of oleaginous liquid vehicle contained in the grease, but is largely dependent upon the solids content and the amount of coupling agent used. The consistency of the grease is easily controlled by varying the amounts of either one or both of the latter two components in the product. Calcium base greases prepared according to our invention are particularly outstanding in that they can be made having A.S.T.M. dropping points of 400° F. or higher. Calcium base greases prepared in accordance to the methods of the prior art have dropping points in the order of 190° F.

It may be well at this point to discuss the relative advantages of the three embodiments of the process of our invention. The first embodiment allows the use of a variety of commercially available oil dispersions containing excess basicity. These dispersions are used commercially in lubricating oils as detergents and reserve alkalinity agents. The second embodiment allows preparation of grease directly without the necessity of going through an intermediate step, thereby eliminating double stripping of solvents. In addition, the second embodiment generally requires less coupling agent than the first embodiment. The third embodiment allows the grease to be prepared from an intermediate as in the first embodiment, which in turn allows the grease to be prepared at a location remote from dispersion-forming facilities. The presence of a portion of the coupling agent during the in situ condensation of the oil-insoluble inorganic compound results in a dispersion having an average particle size smaller than the dispersion of the first embodiment, which in turn generally requires the use of less coupling agent than in the first embodiment. In addition, step one of the third embodiment is a general method for preparing dispersions having ultrafine particle size.

In order to disclose the nature of the present invention still more clearly, the following illustrative examples will be given. It is to be understood that the invention is not to be limited to the specific conditions or details set forth in these examples except in so far as such limitations are specified in the appended claims. Parts given are parts by weight. In the examples, the numerical value preceding pale oil designates the viscosity at 100° F. in Saybolt Universal seconds. Base numbers were determined by the acetic acid titration method which utilizes glacial acetic acid as the solvent and a solution of perchloric acid in glacial acetic acid as the titrant. The method is especially adapted for determination of this type since equilibria are obtained rapidly. The procedures for carrying out acetic acid titrations are generally outlined in Analytical Chemistry, vol. 23, No. 2, February 1951, page 337, and vol. 24, No. 3, March 1952, page 519.

As used herein, polydodecylbenzene sulfonic acid is the acid obtained by sulfonating polydodecylbenzene. Polydodecylbenzene comprises monoalkylbenzene and dialkylbenzenes in the approximate ratio of 2:3. Its typical physical properties are as follows:

| | |
|---|---|
| Specific gravity at 38° C. | 0.8649 |
| Average molecular weight | 385 |
| Percent sulfonatable | 88 |
| A.S.T.M.—D-158 Engler: | |
| I.B.P. °F | 647 |
| 5 °F | 682 |
| 50 °F | 715 |
| 90 °F | 760 |
| 95 °F | 775 |
| F.B.P. °F | 779 |
| Refractive index at 23° C. | 1.4900 |
| Viscosity at: | |
| −10° C. centipoises | 2800 |
| 20° C. do | 280 |
| 40° C. do | 78 |
| 80° C. do | 18 |
| Aniline number °C | 69 |
| Pour point °F | −25 |

The following examples illustrate the first embodiment of our invention.

EXAMPLE 1

A slurry consisting of 460 parts of calcium oxide and 2,000 parts of methanol was added to a jacketed reaction vessel fitted with an agitator. Hydrogen sulfide gas was then passed through the mixture at a rate slightly greater than the gas was absorbed while the mixture was agitated for a period of 5½ hours. The maximum temperature during the reaction period was 41° C., and at the end of the 5½-hour period the temperature was 26° C. This product was then filtered to remove traces of impurities.

A dispersion of calcium carbonate in the oil was prepared from the foregoing solution of calcium hydrosulfide as follows: 75 parts of 170 pale oil, 250 parts of naphtha solution of polydodecylbenzene sulfonic acid (10 parts solvent-3 parts acid), and 200 parts of the methanol solution of calcium hydrosulfide were placed in a jacketed reaction vessel. The mixture was cooled and then blown with carbon dioxide which reacted with the hydrosulfide, thus releasing hydrogen sulfide and forming a dispersion of calcium carbonate in the mixture. During the first 30 minutes of the reaction, 175 parts of benzene was added to the mixture to offset the increase in viscosity due to the formation of calcium carbonate. Carbon dioxide was passed through the reaction mass for a total of 4 hours. At the end of the 4-hour period, the solvents which comprise naphtha, methanol, and benzene were stripped out of the mass by heating to 150° C. The bright viscous product which was finally obtained consisted of calcium carbonate dispersed by calcium polydodecylbenzene sulfonate in the pale oil. The base number of the product was 239 and contained 11.1 percent calcium and 3.1 percent sulfur. Analysis disclosed that the ratio of calcium polydodecylbenzene sulfonate to calcium carbonate to be 1.63 to 1.

An amount of 25.2 parts of the foregoing dispersion was diluted with 147 parts of 170 pale oil. To this solution was added, with stirring at room temperature, 6 parts of Pluroxin E-231 dissolved in a solution consisting of 32 parts of acetone and 140 parts of benzene. When the reaction was completed, the solvents, acetone, and benzene were removed by heating the mixture to 150° C. A clear amber gel was obtained. This gel was then worked to form a grease having a penetration of $310 \times 10^{-1}$ mm. which corresponds in consistency to a wheel bearing grease. This grease did not melt at 428° C.

EXAMPLE 2

Another grease was made from the oil dispersion of calcium carbonate described in Example 1 as follows: a mixture of 11 parts of the concentrated calcium carbonate dispersion with 26 parts 170 pale oil and 88 parts benzene was prepared. To this mixture there was added while stirring 1.2 parts diglycolic acid dissolved in a mixture of 47.3 parts isopropyl alcohol and 44 parts benzene. A reaction occurred spontaneously at room temperature evolving $CO_2$. The reaction was completed by stirring and heating to 150° C., and while heating to this temperature the solvents isopropyl alcohol and benzene were removed. The product was a clear amber grease and did not require any mechanical working. This grease had a penetration of about $300 \times 10^{-1}$ mm. This grease when melted reformed to a grease on cooling below the melting point of 302° F.

EXAMPLE 3

A mixture consisting of 60 parts 170 pale oil, 200 parts of a naphtha (3 volumes) solution of polydodecylbenzene sulfonic acid (1 volume) in which the sulfonic acid amounted to about 0.7 meq. per gram of solution, and 45 parts barium oxide dissolved in 220 parts methanol was blown with $CO_2$ for 105 minutes at room temperature, and then for an additional 15 minutes with heating to 50° C. The reaction which took place converted the barium oxide in the reaction mixture to a dispersion of barium carbonate. The solvents, methanol and naphtha, were then removed by heating to 150° C. for 1 hour at atmospheric pressure and then for 10 minutes longer under reduced pressure to remove traces of water. The resulting dispersion-in-oil of barium carbonate is a bright oily product, base No. 121.

A grease was prepared in the following way from the barium carbonate dispersion produced above: 1.05 parts of 2-ethyl butyl acid phosphate (a 50:50 mixture of di- and mono-esters) was mixed with a solution of 4.6 parts of the barium carbonate dispersion dissolved in 3.46 parts of 170 pale oil. This reaction mixture thickened when heated to 70° C. to obtain a rubbery gel. When this product was blended with 17.3 parts 170 pale oil at 140° C., a grease lubricant was obtained.

EXAMPLE 4

An oil dispersion of calcium carbonate was prepared having a base number of 203 by a process similar to the method described in Example 1 except that the amount of lime used was reduced. This dispersion had a ratio of calcium polydodecylbenzene sulfonate/calcium carbonate of 2.3 to 1.

A lubricating grease was prepared by mixing .906 parts pelargonic acid, 3.36 parts of the above calcium carbonate dispersion, 7 parts of 170 pale oil, and then heating this mixture while stirring to 180° C. $CO_2$ evolved during the reaction which produced a clear reddish lubricating grease having about a NLGI No. 2 grease consistency.

EXAMPLE 5

A dispersion of potassium carbonate in a mineral lubricating oil was first prepared by emulsifying in a Waring Blendor at 80° C., an aqueous solution of 50 parts potassium carbonate dissolved in 50 parts water with 150 parts 170 pale oil containing as the dispersant 50 parts of the reaction product of wax olefin with potassium pentasulfide. The dispersant just referred to had been prepared by heating a wax olefin (from the chlorination-dehydrochlorination of paraffin wax) containing 1.7 C=C double bonds per mole with 20 percent by weight of potassium pentasulfide at 180° C. for 2 hours in a nitrogen atmosphere, and filtering the product. The above-described emulsion was converted into a solids-in-oil dispersion upon dehydrating it while stirring by heating it to 175° C.

A grease was formed from the foregoing dispersion by mixing 11.2 parts of it with 0.79 part of 2-ethyl acid phosphate at room temperature. $CO_2$ was evolved, no heating was required and the reaction mass became a stiff grease.

EXAMPLE 6

A borax dispersion in oil was prepared by emulsifying a hot solution of 65 parts borax dissolved in 200 parts water, with an oil solution heated to 80° C. consisting of 32.5 parts polydodecylbenzene sulfonic acid, 83.5 parts naphtha, and 155 parts raw 150 pale oil. A Waring Blendor equipped with an immersion heater was used for producing the emulsion, and the temperature was raised therein to dehydrate the product to a final end point of 160° C., thus converting the emulsion into the borax dispersion. This dispersion was centrifuged to remove traces of residual gritty material to give a clear oily product.

A grease was prepared from the foregoing borax dispersion by mixing 1.134 parts of n-butyl acid phosphate with 23 parts of the borax dispersion at room temperature. A spontaneous reaction occurred causing formation of a stiff grease. A softer grease is obtained when 0.45 part of the butyl acid phosphate was used with 23 parts of the borax dispersion.

EXAMPLE 7

An amount of 500 parts of a 30 percent active neutral barium polydodecylbenzene sulfonate (prepared by adding a stoichiometric amount of barium oxide dissolved in methanol to polydodecylbenzene sulfonic acid) was heated to 80° C. and 29.6 parts of tertiary butyl phenol added thereto. By the phrase "30 percent active" is meant a mixture consisting of 30 percent salt and 70 percent oil. Then 246 parts of water was added to the mixture with stirring to insure thorough mixing. An amount of 91.4 parts of barium oxide was added thereto over a 30-minute period at 55–80° C. The mixture was agitated for about 10 minutes more at 80° C., then the temperature was raised to 100° C., and held there for one hour. Thereafter, the temperature was raised to about 150° C., and maintained at that level for one hour. Following this step, $CO_2$ was blown through the mass until about 75 parts thereof had been used over a period of three hours and at a temperature of 135–170° C. The mass was then filtered and the product was found to have the following properties:

Base number _____ 97.0
Percent sulfate ash _____ 25.7

Two greases were formulated from the above-identified dispersion by the addition of Pluroxin E-231. Both of which contained 20 percent total solids wherein the solids were expressed as equal to the unreacted barium bicarbonate plus the barium pluroxinate formed by the reaction. The grease in which 62½ percent of the barium bicarbonate had reacted with the Pluroxin E-231 melted at 158° F. The grease in which 70 percent of the total barium bicarbonate had reacted with the Pluroxin E-231 melted at 302° F. These greases when melted reform to their original consistency if cooled below the melting points.

EXAMPLE 8

A lubricating grease was prepared by mixing 3.12 parts of Pluroxin E-231 with 20.7 parts of the potassium carbonate dispersion prepared as described in Example 5, which was diluted with 150 parts of 150 pale oil. The reaction was conducted at 60° C., and carbon dioxide was evolved with simultaneous thickening of the product. This grease melted reversably at 212° F.

EXAMPLE 9

Another dispersion of calcium carbonate in oil, produced in the manner of Example 1 but using an amount of calcium oxide to give a base number of 95 and a synthetic oil (hexa 2-ethyl butoxy disiloxane) instead of the pale oil, was prepared. A grease was prepared from this dispersion as follows:

A mixture of 2.41 parts of the dispersion of the calcium carbonate with 2.45 parts of the synthetic oil and 2.56 parts of benzene was prepared. To this mixture was added .25 part of 3-methyl glutaric acid, .0064 part of water, 1.06 parts of acetone, and 2.56 parts of benzene. In the experimental procedure, the acid was completely dissolved before the benzene was added. Following the addition of the materials, a reaction occurred spontaneously evolving carbon dioxide. The reaction was completed by stirring and heating to 150° C., which simultaneously removed the solvents, acetone, benzenes, and water, thus producing a bright, brown, clear and buttery base grease. If desired, the mixture may be blown with nitrogen during the heating period to facilitate the removal of solvents. By adding varying amounts of this product to a synthetic lubricant (the same synthetic lubricant used in the preparation of the dispersion), grease type lubricants were obtained. The finished grease of this example had an A.S.T.M. dropping point of about 265° C. It was clear, had very little odor, melted reversably, and was highly resistant to boiling water as is evident from the fact that less than 20 percent of the grease was emulsified by boiling in water for 50 minutes.

The following example illustrates the preparation of a dispersion of a calcium-containing inorganic compound in accordance with the teachings of application Serial No. 15,032.

EXAMPLE 10

A reaction vessel equipped with three reflux condensers was charged with 3,600 parts of methoxy ethanol and 600 parts of calcium carbide. Heating was started, and the reaction was maintained at reflux for 3½ hours. Ignoring alcohol weight loss during the $CO_2$ addition, 333 parts of $CO_2$ was added through a fritted tube. After filtering through a diatomaceous earth filter aid, 3,948 parts of bright reddish-brown solution were obtained. It analyzed 7.22 percent calcium and 7.98 percent $CO_2$.

A reaction vessel equipped with a stirrer, dropping funnel, thermometer, and reflux condenser was charged with 28.7 parts of sulfonic acid, 34.6 parts of 170 pale oil, 14 parts water (1.1 times the stoichiometric requirement), and 121.7 parts of naphtha. To this mixture was added with agitation 211 parts of calcium methoxy ethoxide carbonate prepared in Example 3 (7.22 weight percent calcium). The addition was completed in less than 10 minutes with the flask contents at room temperature and the intermediate at 75–80° C. The mixture was refluxed for approximately 15 minutes. The apparatus was then changed for simple distillation, and the preparation was stripped to 150–155° C. with $CO_2$ blowing for approximately 15 minutes at that temperature.

99.2 parts of a dark brown bright viscous product having a base number of 364 was obtained.

The following example illustrates the preparation of a grease from a dispersion of a calcium-containing inorganic compound prepared in the manner shown in Example 10.

EXAMPLE 11

A Hobart mixer, equipped for the following operations, was charged with 264 grams of the dispersion of calcium-containing inorganic compound (Process Lab. No. 780,213, 280 base number, and about 27 percent calcium PDB sulfonate), 714 grams of 170 pale oil, and 400 milliliters of benzene. To these materials was added a solution which contained 56 grams of 3-methyl glutaric acid, 2 ml. of $H_2O$, 200 ml. of acetone and 400 ml. of benzene. Continuous agitation was maintained, and the temperature of the total mass was brought to reflux (about 140° F.). Upon reaching this temperature, the solvents were allowed to reflux for 30 minutes. After the reflux period, the solvents were removed by heating to 400° F. The mixture was then allowed to cool to ambient temperature while being stirred under reduced pressure. A brown buttery grease resulted which had the following composition:

|  | Percent |
|---|---|
| Calcium 3-methyl glutarate | 7.06 |
| Calcium carbonate | 2.75 |
| Calcium PDB sulfonate | 7.12 |
| 170 pale oil | 83.07 |

The grease had the following physical data:

| A.S.T.M. penetration: | |
|---|---|
| As received | 310 |
| 60 stroke | 415 |
| Dropping point | ° F__ 500+ |

The following example illustrates the preparation of a dispersion of a magnesium-containing inorganic compound in accordance with the teachings of application Serial No. 15,031.

EXAMPLE 12

A reaction vessel equipped with a thermometer and two reflux condensers was charged with 20.5 parts of magnesium and 350 parts of methoxy ethanol.[1] The contents of the reactor were initially heated to 50° C. to initiate the reaction. After the reaction was initiated, the heat of reaction was sufficient to maintain the temperature within the range of 70 to 80° C. The reaction was allowed to proceed to completion during which time it became quite vigorous. After the reaction had subsided, the product was filtered. After filtering the filtrate so obtained was blown with carbon dioxide, forming magnesium methoxy ethoxide-carbonate. Analysis showed the solution to contain 6.36 percent magnesium. Filtration is only necessary to remove the small amount of impurities present in the original magnesium. If pure magnesium is used, filtration is unnecessary.

To a reaction vessel equipped with a stirrer, dropping funnel, thermometer, and reflux condenser were charged 171.4 parts of postdodecylbenzene sulfonic acid, 1,218.9 parts of naphtha, 304.3 parts of 170 pale oil, and 52.9 parts of water (1.4 times the stoichiometric requirement). Stirring was commenced, and 493.5 parts of a solution of magnesium methoxy ethoxide carbonate of Example 1 after diluting with an additional quantity of monomethyl ether of ethylene glycol to give a solution having a concentration of 5.53 percent magnesium was added over a period of 3 minutes. The reaction mixture was refluxed for a period of 15 minutes at a temperature varying from 60 to 70° C., after which volatile components were removed by distillation. The reaction mixture was then blown with carbon dioxide while heating at a temperature of 150° C. for a period of 20 minutes, which removed all unreacted water and monoethyl ether of ethylene glycol. Five hundred ninety-six and 8 tenths parts of a final product was obtained, which was bright, clear, and fluid. It had a base number of 200.

The following example illustrates the preparation of a grease from a dispersion of a magnesium-containing inorganic compound, prepared in accordance with the procedure of Example 12.

EXAMPLE 13

A Hobart mixer, equipped for the following operation, was charged with 520 grams of the dispersion of magnesium-containing inorganic compound (Process Lab. No. 7777–B, 281 acetic base number, 28 percent magnesium sulfonate), 745 grams of 170 pale oil, and 400

---
[1] Referred to as monomethyl ether of ethylene glycol in application Serial No. 15,031.

ml. of benzene. To these materials was added a solution which contained 161 grams of 3-methyl glutaric acid, 4 ml. of $H_2O$, 200 ml. of acetone, and 400 ml. of benzene. Continuous agitation was maintained, and the temperature of the mass was brought to reflux (about 140° F.). Upon reaching this temperature, the solvents were allowed to reflux for 30 minutes. After the reflux period, the solvents were removed by heating to 400° F. The mixture was then allowed to cool to ambient temperatures while being stirred under reduced pressure.

A brown buttery grease resulted which had the following composition:

|  | Percent |
|---|---|
| Magnesium 3-methyl glutarate | 13.7 |
| Magnesium carbonate | 1.2 |
| Magnesium PDB Sulfonate | 10.75 |
| 170 pale oil | 74.35 |

The grease had the following physical properties:

A.S.T.M. penetration:
  As received _____ 195
  60 stroke _____ 310
Dropping point _____ °F__ 468

EXAMPLE 14

A test was used to screen potential coupling (or grease-forming) agents. The procedure used was to add to an amount of colloidal calcium carbonate dispersion the appropriate amount of acid necessary for reaction with all of the calcium carbonate present in the dispersion. The mixture was then slowly heated with stirring until gelation occurred. The stability of the resulting gel was determined by working both at room temperature and at 350° F.

All the coupling agents used in Examples 1-13 were satisfactory, specifically including the following:

Diglycolic acid
Pelargonic acid
Alkyl acid phosphates wherein the alkyl group contains from 3 to 8 carbon atoms
Pluroxin E-231
3-methyl glutaric acid

EXAMPLE 15

Using the test procedure outlined in Example 14, the following materials were found to be unsatisfactory as coupling (or grease-forming) agents:

Myristic acid
  Adipic acid
  Azelaic acid
  Glutaric acid
  Sebacic acid
  Suberic acid
  Maleic acid
  Acetone dicarboxylic acid
  4,5-imidazaole dicarboxylic acid
  2,5-dihydroxy benzoic acid
  Trimesic acid
  Aconitic acid
  Carboxy-methyl mercapto succinic acid
  Nitriloacetic acid
  1,2,3-propane tricarboxylic acid The following examples illustrate the second embodiment of our process. In this embodiment the coupling agent is added while forming the colloidal dispersion of inorganic compound.

EXAMPLE 16

An alcoholic solution of calcium hydrosulfite was prepared in the following manner: Into an apparatus equipped for efficient agitation and cooling was charged 100 parts of methanol, 20 parts of powdered anhydrous lime, and 8 parts of diatomaceous earth filter aid. The mixture was continuously agitated and hydrogen sulfide passed in until the heat of reaction subsided. The resultant dark green mixture was allowed to settle and then was filtered to remove filter aid and impurities. The resulting solution contained calcium hydrosulfide and had a base number of 278.

EXAMPLE 17

A grease was prepared by charging a reactor with 144 parts of a naphtha solution of postdodecylbenzene sulfonic acid (0.52 meq./gram of acid of molecular weight 445), 50 parts of 170 pale oil, and 55 parts of alcoholic calcium hydrosulfide, as prepared in Example 16, and 9.1 parts of Pluroxin E-231[1] (40 percent of theoretical amount). The mixture was agitated and blown with carbon dioxide for a total of four hours, during which time the calcium hydrosulfide was converted to calcium carbonate, and hydrogen sulfide was liberated. About 115 parts of benzene was added during the carbon dioxide blowing to offset the increase in viscosity of the mixture. At the time of the blowing period, the solvents comprising of naphtha, methanol and benzene were stripped out of the mass by heating to 150° C. The product was a clear, amber gel which, on working, yielded a grease corresponding to wheel bearing grease. The product had a base number of 60.

EXAMPLE 18

Example 17 was repeated using the following quantities of materials:

60 parts of 170 pale oil
200 parts of naphtha solution of postdodecylbenzene sulfonic acid (.102 milliequivalent of sulfonic acid per gram of solution)
119 parts of alcoholic calcium hydrosulfide as prepared in Example 17
29 parts of Pluroxin E-231 (44% of theoretical amount)

The product obtained was a very stiff grease into which an additional 372 parts of 170 pale oil was blended yielding a grease having a base number of 14.5 and a penetration of $105 \times 10^{-1}$ mm. The grease analyzed 11.9 percent calcium sulfonate, 6.3 percent calcium pluroxinate and 1.3 percent calcium carbonate.

In Table I, data are given to compare compositions prepared in accordance with the first and second embodiments of our process. Examples 19 and 21 use the same quantities of material. Also, Examples 20 and 22 use the same quantities of materials. Examples 19 and 20 were prepared in accordance with embodiment one, that is, the coupling agent was added to the colloidal dispersion of inorganic compound. Examples 21 and 22 were prepared in accordance with embodiment two, that is, the coupling agent was present during the formation of the colloidal dispersion. In the second embodiment, the coupling agent acts as a secondary crystal growth inhibitor, resulting in smaller total coupling agent requirement. Pluroxin E-231 was used as the coupling agent in all examples. From the table, it may be seen that in Example 20, a grease, which was too soft to measure penetration, was obtained, while in Example 22, utilizing the same quantities of material, a grease having a penetration of $270 \times 10^{-1}$ mm. was obtained. Similarly, from the table, it may be seen that in Example 19, a grease was obtained having a penetration of 220, while in Example 21 (embodiment two) a grease was obtained having a penetration of 180.

---
[1] This is a trademark material obtainable from the Wyandotte Chemical Corporation. Its properties are as follows: molecular weight of 231, density of 1.3, refractive index of 1.468, freezing point cf —16 to —20° C., and the general formula $HOOC(C_2H_4O)_xCOOH$, wherein $x$ has the average value of 3.2.

Table I
PREPARATION OF GREASES

|  | Example number | | | |
|---|---|---|---|---|
|  | 19 | 20 | 21 | 22 |
| Reactants: | | | | |
| 170 pale oil, parts | 88.8 | 91.6 | 88.8 | 91.6 |
| Benzene, parts | 100 | 100 | 100 | 100 |
| Pluroxin E-231, parts | ¹2.5 | ¹1.87 | 2.5 | 1.87 |
| Naphtha solution of sulfonic acid (1.06 meq./g.), parts | 21.0 | 15.7 | 21.0 | 15.7 |
| Methanolic Ca(SH)₂ (4.7 meq./g.), parts | 13.9 | 10.4 | 13.9 | 10.4 |
| Product analysis: | | | | |
| 170 pale oil, parts | 88.8 | 91.6 | 88.8 | 91.6 |
| Ca Pluroxinate, parts | 2.91 | 2.18 | 2.91 | 2.18 |
| equivalents | (0.0216) | (0.0162) | (0.0216) | (0.0162) |
| Ca sulfonate, parts | 7.2 | 5.4 | 7.2 | 5.4 |
| Ca carbonate, parts | 1.08 | 0.82 | 1.08 | 0.82 |
| equivalents | (0.0216) | (0.0162) | (0.0216) | (0.0162) |
| Penetration, mm. ×10⁻¹ | 220 | Fluid | 180 | 270 |
| Particle size | 0.3 | 0.3 | Diffuse | Diffuse |

¹ Pluroxin E-231 added after solvents had been removed.

The following example illustrates step one of the third embodiment of our process. In this embodiment a minor amount (less than a grease-forming amount) of the coupling agent is added prior to the formation of the dispersion.

EXAMPLE 23

A dispersion of calcium carbonate in oil was prepared by charging a reactor with 192 parts of a naphtha solution of postdodecylbenzene sulfonic acid (0.25 meq./g. of acid of molecular weight 445), 23 parts of 170 pale oil, and 113 parts alcoholic-calcium hydrosulfide as prepared in Example 1, and 11.55 parts of Pluroxin E-231 (33 percent of theoretical amount). The properties of this particular compound are as follows: molecular weight of 231, density of 1.3, refractive index of 1.468, freezing point of −16 to −20° C. and the general formula $$HOOC(C_2H_4O)_xCOOH$$

wherein $x$ has an average value of about 3.2. This particular compound is available from the Wyandotte Chemical Corporation of Wyandotte, Michigan, under the trade name Pluroxin E-231. The mixture was agitated and blown with carbon dioxide for a total of 4 hours during which time the calcium hydrosulfide was converted to calcium carbonate and hydrogen sulfide was liberated. About 115 parts of benzene was added during the carbon dioxide blowing to offset the increase in viscosity of the mixture. At the end of the blowing period, the solvents comprising naphtha, methanol, and benzene were stripped out of the mass by heating to 150° C. The bright viscous product which was obtained consisted of calcium carbonate dispersed by calcium postdodecylbenzene sulfonate in pale oil. The base number of the product was 196. Electron microscopic examination at a magnification of 21,000 diameters showed the material to have a diffuse structure in which there were practically no individual particles. A composition prepared in a similar manner without a portion of the coupling agent present as a crystal growth inhibitor had particle diameters of dispersed calcium carbonate of about 0.3 micron.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A method of preparing a heat-stable grease which comprises:
   (A) forming a colloidal dispersion which comprises about 1 to about 35 weight percent of an oil-insoluble metal compound, characterized in that the anion thereof is selected from the group consisting of hydroxide, carbonate, and mixtures of hydroxide and carbonate, about 2 to about 55 weight percent of an oil-soluble dispersing agent, and about 10 to about 97 weight percent oleaginous liquid vehicle, in a volatile solvent, said colloidal dispersion being characterized further in that the metal compound is formed in the presence of said dispersing agent and has a particle size of less than 5 microns;
   (B) adding to the colloidal dispersion an acidic coupling agent, selected from the group consisting of diglycolic acid, 3-methyl glutaric acid, pelargonic acid, alkyl acid phosphates wherein the alkyl group contains from 3 to 8 carbon atoms, and a polyoxyalkylene dicarboxylic acid having the formula $$HOOC(C_2H_4O)_xCOOH$$

wherein $x$ has an average value of about 3.2, in an amount varying from about 30 to about 100 percent of the theoretical amount required to react with said metal compound;
   (C) removing the volatile materials and thereby forming a grease.

2. A method of preparing a heat-stable grease which comprises:
   (A) forming a colloidal dispersion which comprises about 2 to about 12 weight percent of an oil-insoluble metal compound, characterized in that the anion thereof is selected from the group consisting of hydroxide, carbonate, and mixtures of hydroxide and carbonate, about 5 to about 15 weight percent of a dispersing agent selected from the group consisting of oil-soluble sulfonic acids, metal salts of oil-soluble sulfonic acids, oil-soluble carboxylic acids, and metal salts of oil-soluble carboxylic acids, and about 73 to about 93 weight percent of a liquid lubricating oil in a volatile solvent, said colloidal dispersion being characterized further in that the oil-insoluble metal compound is formed in the presence of said dispersing agent and has a particle size of less than about 0.5 micron;
   (B) adding to the colloidal dispersion an acidic coupling agent, selected from the group consisting of diglycolic acid, 3-methyl glutaric acid, pelargonic acid, alkyl acid phosphates wherein the alkyl group contains from 3 to 8 carbon atoms, and a polyoxyalkylene dicarboxylic acid having the formula $$HOOC(C_2H_4O)_xCOOH$$

wherein $x$ has an average value of about 3.2, in an amount varying from about 30 to about 100 percent of the theoretical amount required to react with said metal compound;
   (C) heating the admixture to a temperature within the range of about 20 to about 150° C.;
   (D) removing the volatile materials and thereby forming a grease.

3. The method of claim 2 wherein the acidic coupling agent is 3-methyl glutaric acid.

4. A method of preparing a heat-stable grease which comprises:
   (A) forming an admixture comprising about 1 to about 35 weight percent of an oil-insoluble metal compound, characterized in that the anion thereof is selected from the group consisting of hydroxide, carbonate, and mixtures of hydroxide and carbonate, about 2 to about 55 weight percent of an oil-soluble dispersing agent, and about 10 to about 97 weight percent of an oleaginous liquid vehicle, said percentages being based on the total composition before addition of an acidic coupling agent, said metal compound being characterized further in that it is formed in the presence of said dispersing agent and has a particle size of less than 5 microns, an acidic coupling agent selected from the group consisting of diglycolic acid, 3-methyl glutaric acid, pelargonic acid, alkyl acid phosphates wherein the alkyl group contains from 3 to 8 carbon atoms, and a polyoxyalkylene dicarboxylic acid having the formula $$HOOC(C_2H_4O)_xCOOH$$

wherein $x$ has an average value of about 3.2, in an amount varying from about 30 to about 100 percent of the theoretical amount required to react with said metal compound;
(B) removing the volatile materials and thereby forming a grease.

5. A method of preparing a heat-stable grease which comprises:
(A) forming an admixture comprising about 2 to about 12 weight percent of an oil-insoluble metal compound, characterized in that the anion thereof is selected from the group consisting of hydroxide, carbonate, and mixtures of hydroxide and carbonate, about 5 to about 15 weight percent of a dispersing agent selected from the group consisting of oil-soluble sulfonic acids, metal salts of oil-soluble sulfonic acids, oil-soluble carboxylic acids, and metal salts of oil-soluble carboxylic acids, and about 73 to about 93 weight percent of a liquid lubricating oil, said percentages being based on total composition before addition of an acidic coupling agent, said metal compound being characterized further in that it is formed in the presence of said dispersing agent and has a particle size of less than 0.5 micron, an acidic coupling agent selected from the group consisting of diglycolic acid, 3-methyl glutaric acid, pelargonic acid, alkyl acid phosphates wherein the alkyl group contains from 3 to 8 carbon atoms, and a polyoxyalkylene dicarboxylic acid having the formula $$HOOC(C_2H_4O)_xCOOH$$

wherein $x$ has an average value of about 3.2, in an amount varying from about 30 to about 100 percent of the theoretical amount required to react with said metal compound;
(B) heating the admixture at a temperature within the range of about 20 to about 150° C.;
(C) removing the volatile materials and thereby forming a grease.

6. The method of claim 5 wherein the acidic coupling agent is 3-methyl glutaric acid.

7. A method of preparing a heat-stable grease which comprises:
(A) forming a colloidal dispersion by admixing about 1 to about 35 weight percent of an oil-insoluble metal compound, characterized in that the anion thereof is selected from the group consisting of hydroxide, carbonate, and mixtures of hydroxide and carbonate, about 2 to about 55 weight percent of an oil-soluble dispersing agent, about 10 to about 97 weight percent of an oleaginous liquid vehicle, said percentages being based on total composition before addition of an acidic coupling agent, said metal compound being characterized further in that it is formed in the presence of said dispersing agent and has a particle size of less than 5 microns, an acidic coupling agent, selected from the group consisting of diglycolic acid, 3-methyl glutaric acid, pelargonic acid, alkyl acid phosphates wherein the alkyl group contains from 3 to 8 carbon atoms, and a polyoxyalkylene dicarboxylic acid having the formula $HOOC(C_2H_4O)_xCOOH$, wherein $x$ has an average value of about 3.2, in an amount varying from about 1 to about 35 percent of the theoretical amount required to react with said insoluble metal compound, said admixture being formed in the presence of a volatile solvent;
(B) adding to the colloidal dispersion an additional amount of said acidic coupling agent for a total amount varying from about 30 to about 100 percent of the theoretical amount;
(C) removing the volatile materials and thereby forming a grease.

8. A method of preparing a heat-stable grease which comprises:
(A) forming a colloidal dispersion by admixing about 2 to about 12 weight percent of an oil-insoluble metal compound, characterized in that the anion thereof is selected from the group consisting of hydroxide, carbonate, and mixtures of hydroxide and carbonate, about 5 to about 15 weight percent of a dispersing agent selected from the group consisting of oil-soluble sulfonic acids, metal salts of oil-soluble sulfonic acids, oil-soluble carboxylic acids, and metal salts of oil-soluble carboxylic acids, and about 73 to about 93 weight percent of a liquid lubricating oil, said percentages being based on total composition before addition of an acidic coupling agent, said metal compound being characterized further in that it is formed in the presence of said dispersing agent and has a particle size of less than 0.5 micron, an acidic coupling agent, selected from the group consisting of diglycolic acid, 3-methyl glutaric acid, pelargonic acid, alkyl acid phosphates wherein the alkyl group contains from 3 to 8 carbon atoms, and a polyoxyalkylene dicarboxylic acid having the formula $HOOC(C_2H_4O)_xCOOH$, wherein $x$ has an average value of about 3.2, in an amount varying from about 1 to about 35 percent of the theoretical amount required to react with the oil-insoluble metal compound, said admixture being formed in the presence of a volatile solvent;
(B) adding to the colloidal dispersion an additional amount of said acidic coupling agent for a total amount varying from about 30 to about 100 percent of the theoretical amount;
(C) heating the admixture at a temperature within the range of about 20 to about 150° C.;
(D) removing the volatile materials and thereby forming a grease.

9. The method of claim 8 wherein the acidic coupling agent is 3-methyl glutaric acid.

10. The method of claim 2 wherein the acidic coupling agent is diglycolic acid.

11. The method of claim 2 wherein the acidic coupling agent is pelargonic acid.

12. The method of claim 2 wherein the acidic coupling agent is an alkyl acid phosphate wherein the alkyl group contains from 3 to 8 carbon atoms.

13. The method of claim 2 wherein the acidic coupling agent is a polyoxyalkylene dicarboxylic acid having the formula $HOOC(C_2H_4O)_xCOOH$, wherein $x$ has an average value of about 3.2.

14. The method of claim 5 wherein the acidic coupling agent is diglycolic acid.

15. The method of claim 5 wherein the acidic coupling agent is pelargonic acid.

16. The method of claim 5 wherein the acidic coupling agent is an alkyl acid phosphate wherein the alkyl group contains from 3 to 8 carbon atoms.

17. The method of claim 5 wherein the acidic coupling agent is a polyoxyalkylene dicarboxylic acid having the formula $HOOC(C_2H_4O)_xCOOH$, wherein $x$ has an average value of about 3.2.

18. The method of claim 8 wherein the acidic coupling agent is diglycolic acid.

19. The method of claim 8 wherein the acidic coupling agent is pelargonic acid.

20. The method of claim 8 wherein the acidic coupling agent is an alkyl acid phosphate wherein the alkyl group contains from 3 to 8 carbon atoms.

21. The method of claim 8 wherein the acidic coupling agent is a polyoxyalkylene dicarboxylic acid having the formula $HOOC(C_2H_4O)_xCOOH$, wherein $x$ has an average value of about 3.2.

References Cited in the file of this patent

UNITED STATES PATENTS

| | | | |
|---|---|---|---|
| 2,394,907 | Gallay et al. | Feb. 12, | 1946 |
| 2,695,910 | Asseff | Nov. 30, | 1954 |
| 2,716,087 | Woodruff | Aug. 23, | 1955 |
| 2,719,826 | Hotten | Oct. 4, | 1955 |
| 2,937,991 | Carlyle | May 24, | 1960 |
| 2,956,018 | Carlyle et al. | Oct. 11, | 1960 |
| 2,969,324 | Knapp et al. | Jan. 24, | 1961 |
| 2,977,300 | Bergen et al. | Mar. 28, | 1961 |
| 2,977,301 | Bergen et al. | Mar. 28, | 1961 |